(Model.)

C. W. HELLENBRAND.
MANUFACTURE OF CANDY.

No. 272,252. Patented Feb. 13, 1883.

2 Sheets—Sheet 1.

WITNESSES:
Francis McArdle
C. Sedgwick

INVENTOR:
C. W. Hellenbrand
BY Munn &Co
ATTORNEYS.

(Model.)  2 Sheets—Sheet 2.

C. W. HELLENBRAND.
MANUFACTURE OF CANDY.

No. 272,252.  Patented Feb. 13, 1883.

WITNESSES:
Francis McArdle
C. Sedgwick

INVENTOR:
C. W. Hellenbrand
BY Munn & Co
ATTORNEYS.

UNITED STATES PATENT OFFICE.

CHARLES W. HELLENBRAND, OF SALEM, OREGON.

MANUFACTURE OF CANDY.

SPECIFICATION forming part of Letters Patent No. 272,252, dated February 13, 1883.

Application filed April 10, 1882. (Model.)

*To all whom it may concern:*

Be it known that I, C. W. HELLENBRAND, of Salem, in the county of Marion and State of Oregon, have invented certain new and useful Improvements in the Manufacture of Candy, of which the following is a full, clear, and exact description.

This invention consists of an improved method of cutting or shaping all kinds of candies that are prepared in pieces of special shapes, as bars, kisses, caramels, squares, almond bar, and other shapes; and it also consists of an improved cutter for the same, all as hereinafter described.

Reference is to be had to the accompanying drawings, forming part of this specification, in which similar letters of reference indicate corresponding parts in all the figures.

Figure 1:
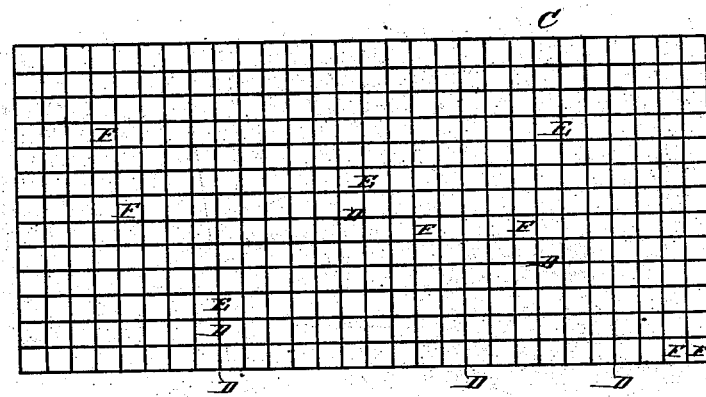
Figure 2:
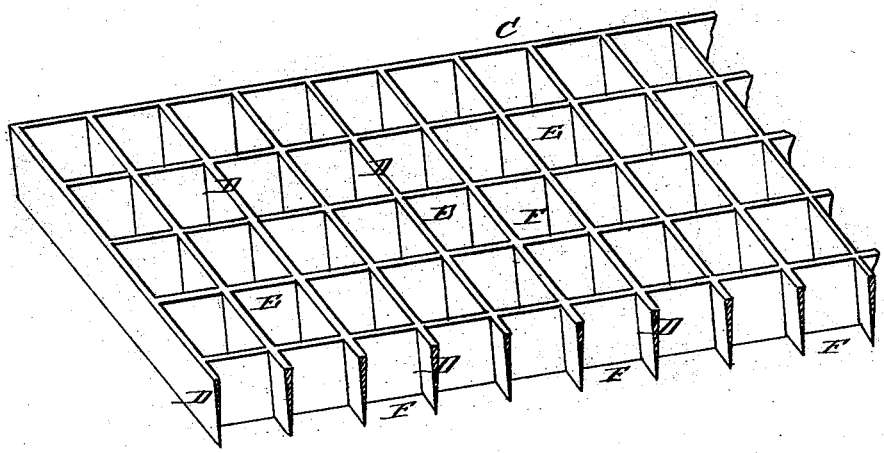
Figure 3:
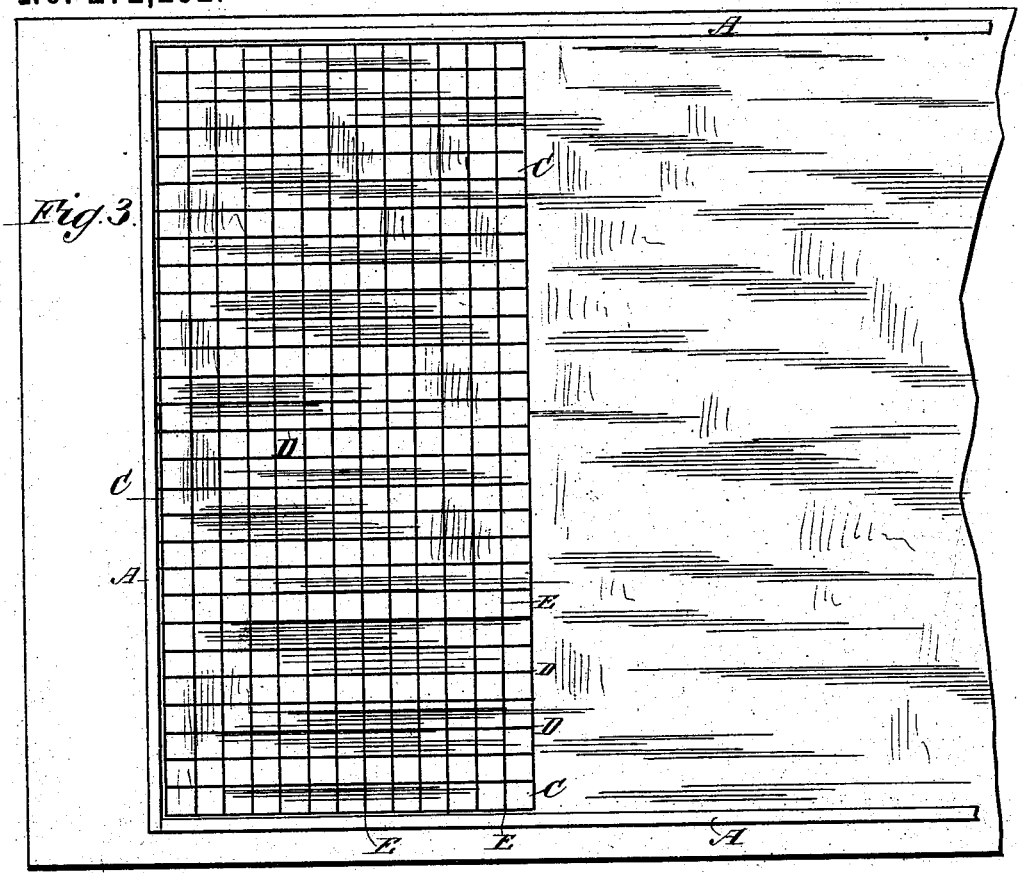
Figure 4:
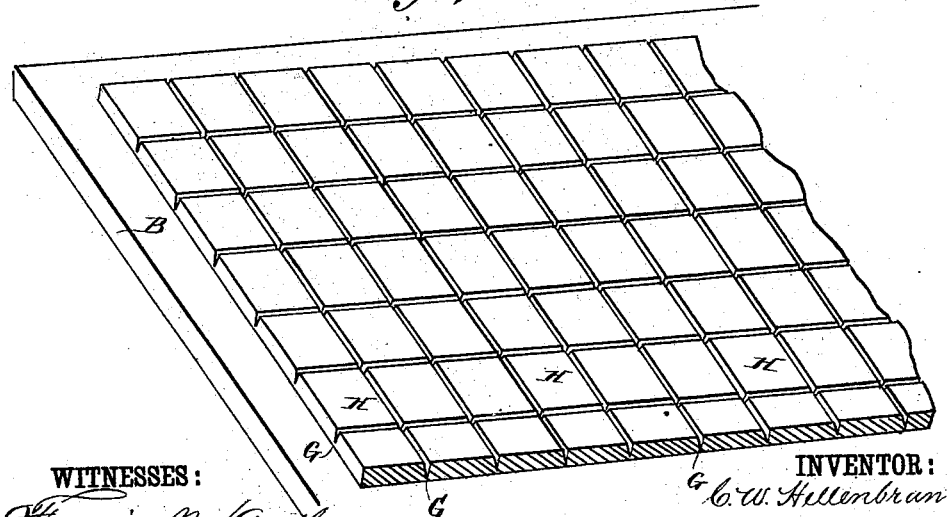

Figure 1 is a plan view of the edges of the improved cutter employed on a reduced scale. Fig. 2 is a perspective view of the back of the said cutter upon a larger scale. Fig. 3 is a plan view of a cooling-table, a batch of candy, and a cutter, showing the method of cutting; and Fig. 4 is a perspective view of a cut and cooled batch of candy as it appears before finally separating the cut pieces.

The present method of making the different shapes in which candies are sold consists of pouring the melted candy on the cooling-table after cooking, to spread out in thin cakes or sheets between the bars A, Fig. 3, laid on the table B, to confine it within the required limits for size and thickness, then cutting it in strips when sufficiently cooled, and running the strips through cutting-machines having dies or cutters of approved shape, according to the particular shape to be given to the candy, to cut up the strips, the said cutters being arranged in rolls, or punching or stamping machines.

My improved method consists of cutting or producing the required shapes while the candy is still in the melted or soft state as soon as or very soon after it is poured on the cooling-table between the confining-bars A, and before it is cooled, by means of multiple or gang cutters C of the form shown, or any other form of equivalent cutter, the same being placed upon the batch or cake within the bars, as shown, while it is sufficiently soft to allow the weight of the cutter to settle down and cut through the mass to or nearly to the bottom. In practice there remains a thin film, G, under each edge of the cutter about as thick as waxed paper, connecting the pieces together with sufficient strength to hold while turning the whole batch after the cutters are removed, so that the grease adhering from the table may be wiped off before separating the pieces H. The pieces, being then separated by the destruction of the said connecting-films G, are found to be much smoother on the angles and cut surfaces than when cut by the common method, which involves much more expensive apparatus and also more labor.

The cutters which I propose may be made with any approved number of sections; but the number which I prefer is three hundred and sixty-four, of which number it will require about five cutters for one batch of candy of the size usually made, the cutters being placed on the batch side by side within the bars. The cutters are preferably formed of cast metal, and consist of two series of blades, D E, those of each series being parallel, and arranged at right angles to the other, so that the spaces F between them are square. Each blade is triangular in cross-section—that is to say, its flat sides are formed in straight lines that diverge vertically from the edge upward. Thus constructed the cutter has sufficient weight to cause it to sink into the soft candy when placed thereon. The form of the blades has special importance in relation to this function, which could not be accomplished with a cutter whose blades have parallel sides, except at the edge.

If desired, handles may be attached to the back, Fig. 2, for greater convenience in handling them; but as they will pack better without handles, and are not difficult to use without them, I prefer not to apply them.

Before using, the cutters should be greased, as it is common to grease the cooling-table, to prevent the candy from sticking and allow the cutters to be removed after the candy has cooled.

Having thus fully described my invention, I claim as new and desire to secure by Letters Patent—

1. The method hereinbefore described, which consists in placing the cutter, constructed as described, upon a batch of soft or melted candy poured upon a cooling-table, and allowing it to remain thereon until its blades have sunk by gravity into and nearly through the batch, as shown and described.

2. The improved metal candy-cutter formed of two series of blades, D and E, which are arranged at right angles, and each blade having a triangular cross-section—that is to say, its flat sides being formed on straight lines that diverge vertically from the edge upward, as shown.

CHARLES W. HELLENBRAND.

Witnesses:
MEMORY CHAPMAN,
MART CHAMBERLIN.